United States Patent
Zhu

(10) Patent No.: US 8,121,068 B2
(45) Date of Patent: Feb. 21, 2012

(54) TECHNIQUES TO IMPROVE CO-EXISTENCE AMONG MULTIPLE RADIOS

(75) Inventor: Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 838 days.

(21) Appl. No.: 12/220,990

(22) Filed: Jul. 30, 2008

(65) Prior Publication Data

US 2010/0027525 A1 Feb. 4, 2010

(51) Int. Cl.
*H04J 3/08* (2006.01)
(52) U.S. Cl. ......... 370/326; 370/458; 370/465; 370/501
(58) Field of Classification Search .................. None
See application file for complete search history.

(56) References Cited

U.S. PATENT DOCUMENTS

| | | | |
|---|---|---|---|
| 6,690,657 B1 * | 2/2004 | Lau et al. ................. | 370/315 |
| 6,842,617 B2 * | 1/2005 | Williams et al. ............. | 455/444 |
| 6,990,082 B1 | 1/2006 | Zehavi et al. | |
| 7,046,649 B2 | 5/2006 | Awater et al. | |
| 7,142,880 B2 | 11/2006 | Schmandt et al. | |
| 7,697,481 B2 * | 4/2010 | Rayzman et al. ............. | 370/331 |
| 7,787,398 B2 | 8/2010 | Liu et al. | |
| 7,941,178 B2 | 5/2011 | Guo et al. | |
| 2002/0028655 A1 * | 3/2002 | Rosener et al. ................. | 455/16 |
| 2002/0075941 A1 | 6/2002 | Souissi et al. | |
| 2004/0125820 A1 * | 7/2004 | Rios ................. | 370/480 |
| 2005/0201340 A1 | 9/2005 | Wang et al. | |
| 2006/0003802 A1 | 1/2006 | Sinai | |
| 2006/0062225 A1 * | 3/2006 | Li ................. | 370/396 |
| 2006/0292987 A1 | 12/2006 | Ophir et al. | |
| 2007/0036170 A1 | 2/2007 | Gonikberg et al. | |
| 2007/0140154 A1 | 6/2007 | Chun | |
| 2007/0232358 A1 | 10/2007 | Sherman | |
| 2007/0238482 A1 * | 10/2007 | Rayzman et al. ........... | 455/552.1 |
| 2007/0275746 A1 | 11/2007 | Bitran | |
| 2007/0280261 A1 * | 12/2007 | Szymanski ................ | 370/395.4 |
| 2008/0247367 A1 | 10/2008 | Guo et al. | |

FOREIGN PATENT DOCUMENTS

WO 2008/124434 A1 10/2008
WO 2008/124445 A1 10/2008

OTHER PUBLICATIONS

Office Action for Korean Patent Application No. 2009-0070210, mailed on Feb. 1, 2011, 2 pages of English Translation.
P. Cheng, et al., "A Study on Cell Search Algorithms for IEEE 802.16e OFDMA Systems," IEEE WCNC 2007 (pp. 1850-1855).
U.S. Patent Application entitled "Architecture and Methods for Coexistence of Wireless Radios Having Differing Protocols," inventors Guo et al., filed Apr. 6, 2007, having U.S. Appl. No. 11/697,369.
International Preliminary Report on Patentability for PCT Patent Application No. PCT/US2008/059131, mailed Aug. 20, 2008, 5 pages.

(Continued)

*Primary Examiner* — Donald Mills
(74) *Attorney, Agent, or Firm* — Glen B Choi

(57) ABSTRACT

Techniques are described that can be used to permit coexistence of different radios. Preambles of frames from a first radio are detected. If the preambles occur within a prescribed period of one another, then a frame synchronization signal is transmitted. Based on the timing of the frame synchronization signal, a second radio adjusts the timing of transmit and receive time slots.

23 Claims, 3 Drawing Sheets

OTHER PUBLICATIONS

Written Opinion for PCT Patent Application No. PCT/US2008/059131, mailed Aug. 20, 2008, 5 pages.

International Search Report and Written Opinion for PCT Patent Application No. PCT/US2008/059153, mailed on Jul. 11, 2008, 11 pages.

Acharya et al., "MACA-P: A MAC for Concurrent Transmissions in Multi-Hop Wireless Networks", First IEEE International Conference on Pervasive Computing and Communications (PerCom 2003), Mar. 23-26, 2003, pp. 505-508.

International Preliminary Report on Patentability for PCT Patent Application No. PCT/US2008/059153, mailed Oct. 15, 2009, 7 pages.

Office Action for U.S. Appl. No. 11/697,369, mailed on Jul. 25, 2011, 11 pages.

Office Action for U.S. Appl. No. 11/697,369, mailed on Nov. 10, 2009, 11 pages.

Office Action for U.S. Appl. No. 11/697,369, mailed on May 4, 2010, 11 pages.

Office Action for U.S. Appl. No. 11/697,369, mailed on Sep. 21, 2010, 13 pages.

Office Action for U.S. Appl. No. 11/697,369, mailed on Apr. 5, 2011, 9 pages.

Office Action Received for Korean Patent Application No. 2009-0070210, mailed on Oct. 13, 2011, 1 page of English Translation.

* cited by examiner

TECHNIQUES TO IMPROVE CO-EXISTENCE AMONG MULTIPLE RADIOS

FIELD

The subject matter disclosed herein relates to managing co-existence of multiple radios.

RELATED ART

With the increasing availability of wireless technology and connectivity, devices carrying multiple radios will not be uncommon. As one example, combinations of Bluetooth, WiFi and WiMAX technologies may be made available on future computation and communication platforms such as laptops and handheld devices. These types of platforms may be equipped with multiple co-located radios. Such platforms may be referred to as a Multi-Radio Platforms (MRPs). MRPs may include the co-location of Bluetooth, WiMAX and even WiFi radios to accommodate various uses and conveniences.

FIG. 1 depicts a scenario involving a multi-radio mobile terminal that performs a network scan to establish a wireless wide area network (WWAN) connection with a WWAN base station while attempting to maintain continuous service over an active wireless local area network (WLAN) connection (e.g., VoIP) with a wireless personal area network (WPAN) accessory (e.g., a Bluetooth headset).

Time Division Multiplex (TDM) is a common solution for the coexistence of multiple radios on the same device. TDM prevents inter-radio interference or resource conflict by interleaving co-located radio activities over time. Typically, WLAN and WPAN operations are blocked during a network scan to establish a WWAN connection.

A network scan to establish a WWAN connection involves detecting frame preambles. For example, under IEEE 802.16e, there are 96 preambles that uniquely identify 32 different cell IDs and three different sectors. Therefore, for one scan per preamble, the total number of scans per channel is 96. If one frame is 5 ms and each scan takes about three frames, it takes approximately 1.44 seconds to scan all preambles over one channel. It is undesirable to block WLAN and WPAN operations for such a long time, particularly when WLAN and WPAN radios are transmitting data traffic.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
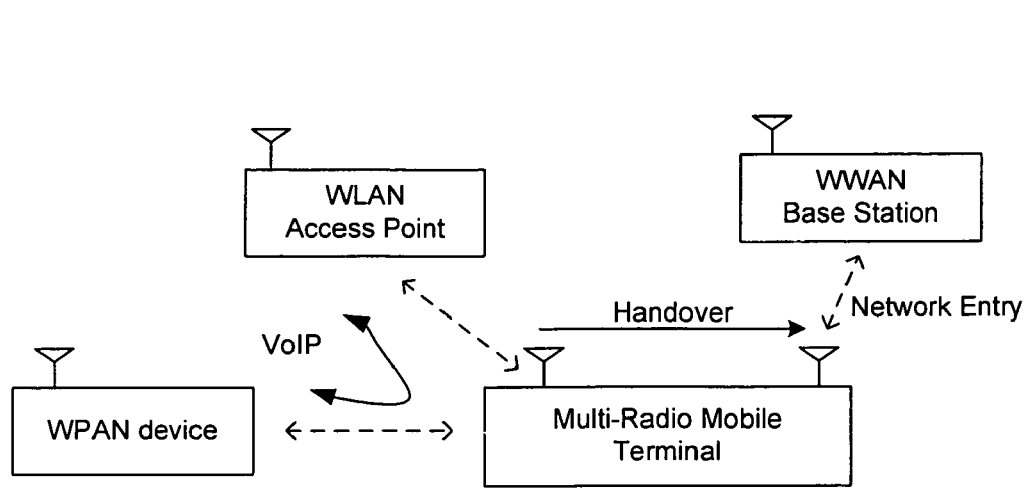
FIG. 1 depicts an example multi-radio platform that connects with a WWAN base station while attempting to maintain a connection with WPAN and WLAN devices.

Reference throughout this specification to ""one embodiment"" or ""an embodiment"" means that a particular feature, structure, or characteristic described in connection with the embodiment is included in at least one embodiment of the present invention. Thus, the appearances of the phrase ""in one embodiment"" or ""an embodiment"" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having ""smart antenna"" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Figure 2:
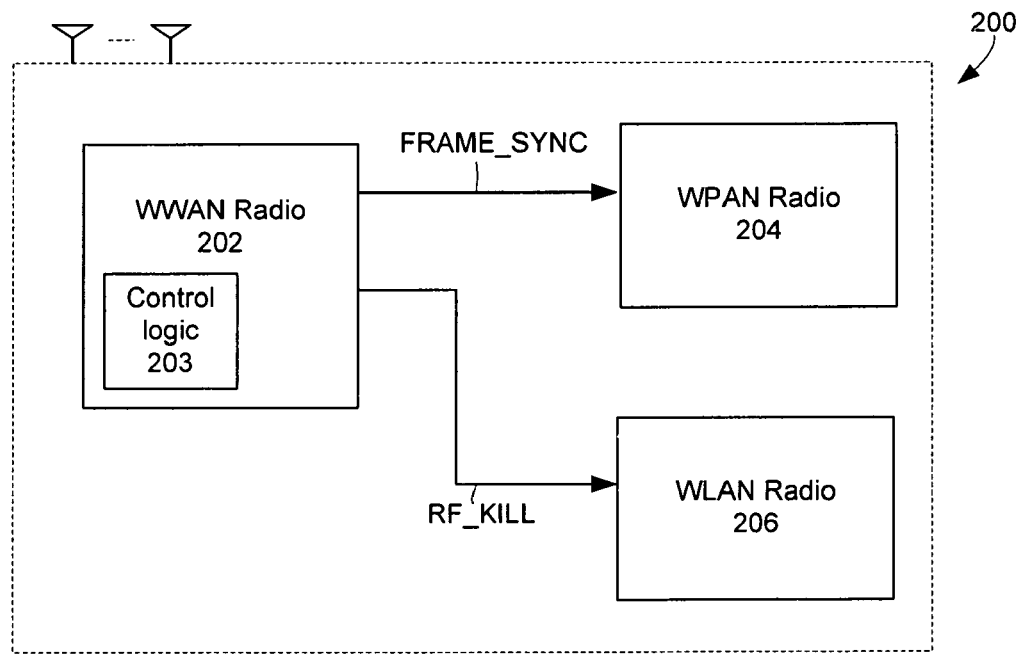
FIG. 2 depicts a multi-radio platform, in accordance with an embodiment of the present invention.

FIG. 2 depicts a multi-radio platform 200, in accordance with an embodiment of the present invention. In one embodiment, WWAN radio 202 includes the capability to operate as a transceiver in compliance with IEEE 802.16, WPAN radio 204 includes the capability to operate as a transceiver in compliance with Blue Tooth, and WLAN radio 206 includes the capability to operate as a transceiver in compliance with IEEE 802.11. In other embodiments, WWAN radio 202, WPAN radio 204, and WLAN radio 206 need not be on the same platform but instead could be located on one or more separate platforms.

WWAN radio 202 includes the capability to transmit signals FRAME_SYNC and RF_KILL to a WPAN radio 204 and WLAN radio 206, respectively. In part, signals FRAME_

SYNC and RF_KILL control the WWAN scanning process and may improve co-existence among WWAN and WPAN radios. A bus (not depicted) or general purpose input/output (GPIO) can be used to transmit signals FRAME_SYNC and RF_KILL. Alternatively, wireless communications may be used to transmit signals FRAME_SYNC and RF_KILL.

Signal FRAME_SYNC may be a reference signal that allows WPAN radio 204 to align its time slots to avoid interference by preambles of WWAN frames. WPAN radio 204 may align its nearest (recent or future) SCO or eSCO (RX) slot boundary to a rising edge of the FRAME_SYNC signal. One embodiment of signal FRAME_SYNC is described in more detail in U.S. patent application entitled "ARCHITECTURE AND METHODS FOR COEXISTENCE OF WIRELESS RADIOS HAVING DIFFERING PROTOCOLS," inventors Guo et al., filed Apr. 6, 2007, having Ser. No. 11/697,369. WPAN radio 204 may control the timing of the commencement of time slots so that (1) time slots are sequential with no gap and (2) a time slot aligns with a rising edge of the signal FRAME_SYNC. WPAN radio 204 may notify other WPAN radios of the shift in time slots using the relevant protocols.

Signal RF_KILL may be used to arbitrate the transmission activities of WLAN radio 206. Using r(t) to denote the RF_KILL signal, transmission by WLAN radio 206 is enabled if r(t)=0 but disabled if r(t)=1.

In one embodiment, WWAN radio 202 includes control logic 203 that controls the format of the signal FRAME_SYNC and timing of when to transmit signals FRAME_SYNC and RF_KILL. Control logic 203 divides the scanning process into preamble detection and frame boundary detection, and uses the reference time provided by the detected preamble during a first time period to align WPAN radio activities such that collisions at a second time period may be avoided. In one embodiment, control logic 203 controls the process described with regard to FIG. 3.

Figure 3:
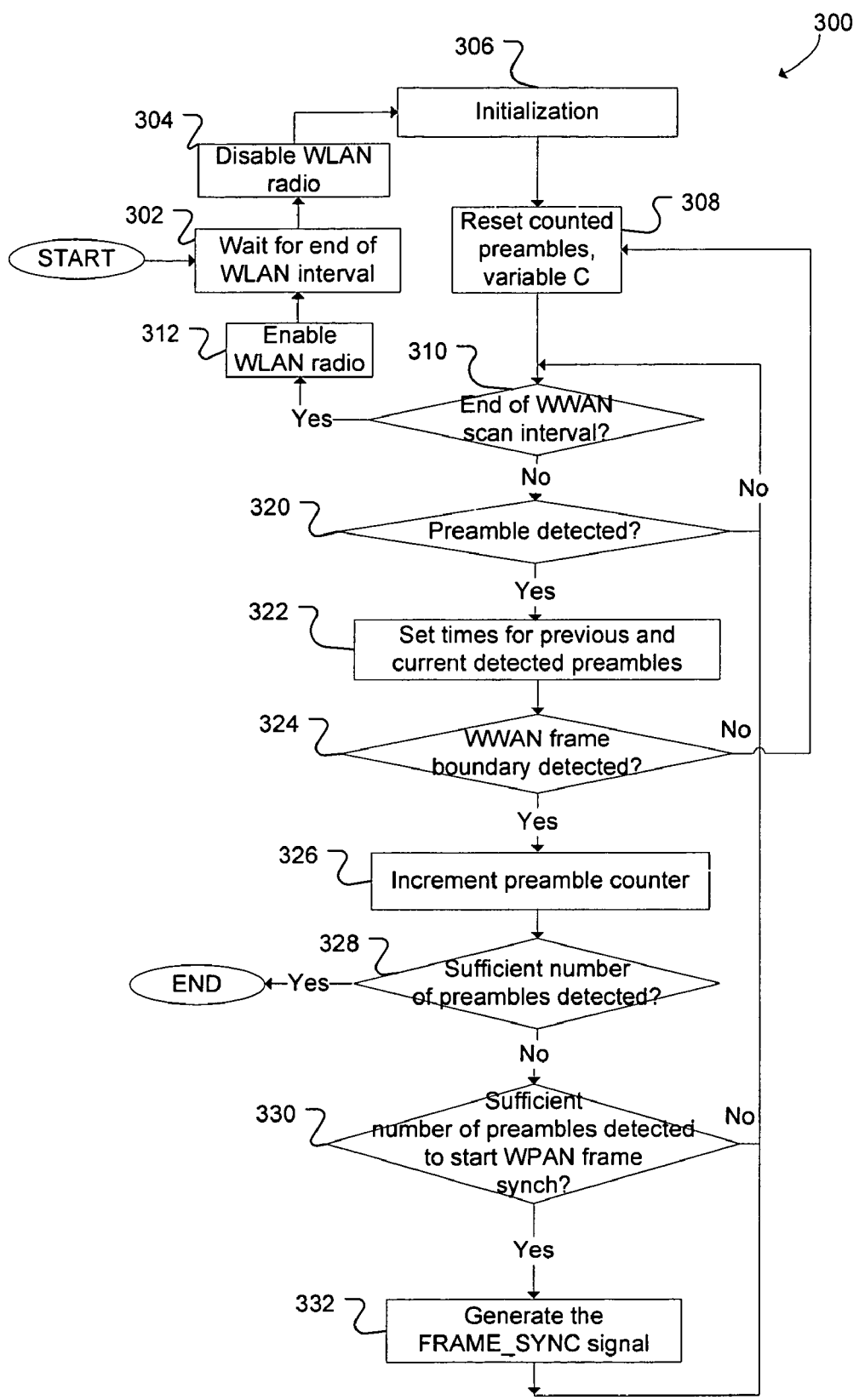
FIG. 3 depicts a process to determine parameters of a synchronization signal, in accordance with an embodiment of the present invention.

FIG. 3 depicts a process 300 that can be used to reduce interference between WPAN frames and WWAN preambles, in accordance with an embodiment of the present invention. Process 300 may execute at the beginning of each WWAN scan period. Table 1 shows an example of WWAN parameters used in process 300.

TABLE 1

|  | T1 | T2 | Tf | $C_{th}1$ | $C_{th}2$ |
|---|---|---|---|---|---|
| Desc. | WWAN inactive interval | WWAN active interval | frame duration | frame boundary detection threshold | preamble detection threshold |
| Value (example) | 9 ms | 21 ms | 5 ms | 2 | 1 |

Block 302 may include waiting for the end of a WLAN active interval. The duration of T1 may be set as the time in which a WLAN radio is active but a WWAN radio is inactive. In one implementation, duration T1 is 9 ms. For example, signal RF_KILL may be set to 0 to enable the WLAN radio during the duration of time T1.

Block 304 may include disabling the WLAN radio after the end of the WLAN active interval. Block 304 may also include activating the WWAN radio for a duration of T2. In one implementation, T2 is 21 ms. For example, signal RF_KILL may be set to 1 in order to disable the WLAN radio during the duration of time T2.

Block 306 may include performing initialization. Initialization may include (1) choosing frequency (f) to scan for WWAN frames; (2) receiving an indication of the symbol for a preamble (s); and (3) resetting variables t0 and t1 to zero. Variable t0 may indicate a time at which a previous preamble was detected whereas variable t1 may indicate the time a current preamble has been detected.

Block 308 may include resetting preamble counter C to zero. Counter C indicates the number of successive detected preambles with the interval between preambles equal to Tf.

Block 310 may include determining whether a WWAN scan interval has ended. For example, the scan interval for a WWAN radio may be set as time T2. If the WWAN scan interval ended, then block 312 may follow block 310. If the WWAN scan interval has not ended, then block 320 may follow block 310.

Block 312 may include enabling the WLAN radio for transmission. For example, signal RF_KILL may be set to 0 in order to enable the WLAN radio. The WLAN radio may be enabled for a duration of time T1.

Block 320 may include determining whether a preamble has been detected in the WWAN scan interval. The preamble may have been transmitted in a WWAN frame by a WWAN base station. Detection of a preamble may occur by the cross-correlation based preamble detection technique described in P. Cheng et al., A Study on Cell Search Algorithms for IEEE 802.16e OFDMA Systems, IEEE WCNC (2007). If a preamble is detected, block 322 may follow block 320. If a preamble is not detected, block 310 may follow block 320.

Block 322 may include setting the timer variable for the previous and current detected preambles. Block 322 may include setting the variable t0 for a previously detected preamble to equal the time in which a previous preamble was detected. Block 322 may also include setting variable t0 to equal the clock count at the time when the most recent preamble was detected. In a first iteration of block 322, t0 may be set to time zero and t0 may be set to the current clock count.

Block 324 may include determining whether a WWAN frame boundary has been met. Block 324 may include determining whether the time difference between a preamble occurrence at time t0 and preamble occurrence at time to is a WWAN frame duration, Tf. A WWAN frame duration may be 5 ms. If a WWAN frame boundary is detected, then block 326 may follow block 324. If a WWAN frame boundary is not detected, then block 308 may follow block 324. Block 324 may be used to verify that a most recently detected preamble is a preamble by determining whether a time between successive preambles coincides with a WWAN frame duration.

Block 326 may include incrementing the preamble detection counter, variable C.

Block 328 may include determining whether a sufficient number of preambles has been detected to verify the period of a WWAN frame. In one example, a sufficient number of measured preambles may be set by variable $C_{th}1$. In Table 1, $C_{th}1$ is two, however, other values can be used. Accordingly, for example, if two time durations are measured between preambles and both time durations match the frame period Tf, then process 300 is satisfied that periodic WWAN frames have been detected. If a sufficient number of preambles has been detected, then process 300 ends. If a sufficient number of preambles has not been detected, then block 330 follows block 328.

The WWAN preamble may be corrupted once every three frames, and only one period with two preambles can be received without interference, thus leading to $C_{th}1$ being set as one. However, $C_{th}1$ may be set to at least two to minimize false alarms, i.e., successfully detecting preambles in three consecutive frames.

Block 330 may include determining whether a sufficient number of preambles has been detected in order to begin synchronization of WPAN frames. For example, variable $C_{th}2$ may establish the number of detected preambles in order to begin synchronization of WPAN frames. In this example, variable $C_{th}2$ is one, but other values can be used such as zero or two or more. If a number of counted preambles matches variable $C_{th}2$, then block 332 may follow block 330. If a number of counted preambles does not match variable $C_{th}2$, then block 310 may follow block 330.

Block 332 may include generating a FRAME_SYNC signal. The FRAME_SYNC signal may include parameters: offset and period, denoted by d and p, respectively. Parameter d indicates the duration between a beginning of the detected preamble and the first rising edge of the FRAME_SYNC signal after the detected preamble. Parameter p indicates the period of rising edges of the FRAME_SYNC signal. Parameters d and p may be configured as follows:

$$d = 2m \times Ts (m = \{1, 2, \ldots\})$$

$$p = 2n \times Ts (n = \{1, 2, \ldots\})$$

where m and n are integers.

The duration d can be set at a minimum of the processing delay of the WWAN radio in detecting the presence of a preamble. The period p may be set to correspond to the smallest possible frequency given hardware constraints. Accordingly, integers m and n are chosen to achieve the desired duration and period values.

Figure 5:
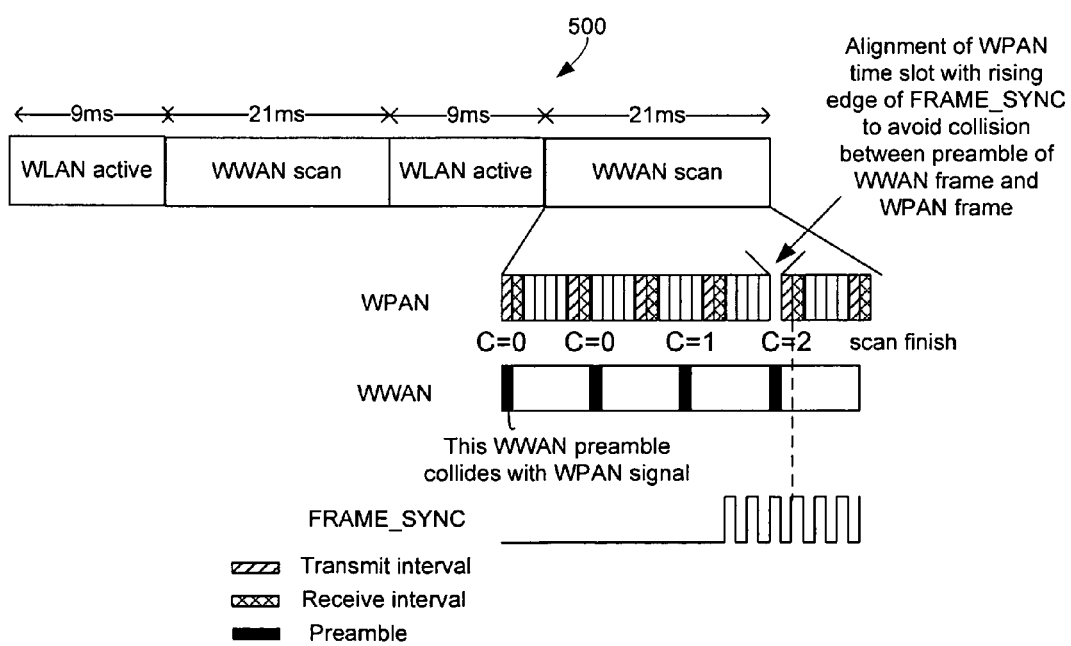
FIG. 5 illustrates an example showing alignment of time slots of a WPAN link in relation to a synchronization signal, in accordance with an embodiment of the present invention.

A WPAN radio assigns time slots based on rising edges of the FRAME_SYNC signal. FIG. 5 provides an example of the assignment of time slots by a WPAN radio in relation to the FRAME_SYNC signal.

Figure 4:
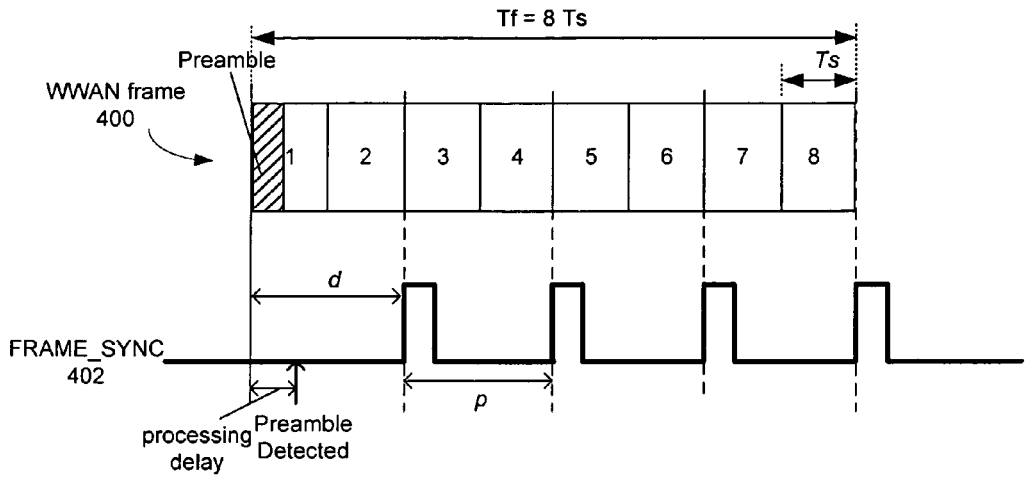
FIG. 4 illustrates a FRAME_SYNC signal in relation to a WWAN frame, in accordance with an embodiment of the present invention.

FIG. 4 illustrates a FRAME_SYNC signal in relation to a WWAN frame, in accordance with an embodiment of the present invention. WWAN frame 400 has a frame duration of Tf, which includes eight time slots (Ts). A preamble is transmitted during the first time slot of the WWAN frame 400. A first rising edge of signal FRAME_SYNC 402 occurs at time d from the beginning of the WWAN frame. Subsequent transitions from 0 to 1 occur at a period p from the first transition. In this example, m=2 and n=2.

The relationships for d and p may ensure that WPAN transmission slots will only occur on the even slots of a WWAN frame (e.g., slots 2, 4, 6, or 8), thereby avoiding the first time slot in each WWAN frame in which the preamble is located. This relationship may avoid collision between WPAN transmissions and WWAN preamble transmission.

FIG. 5 illustrates an example showing alignment of time slots of a WPAN link in relation to a synchronization signal, in accordance with an embodiment of the present invention. The example of FIG. 5 shows periodic WLAN active intervals followed by WWAN scan intervals. In this example, the WLAN active intervals are 9 ms whereas the WWAN scan intervals are 21 ms. The WPAN link is periodic with one transmit slot followed by one receive slot among six slots. In one embodiment, one WPAN time slot has the same size as one time slot of a WWAN link.

In one embodiment, a WWAN frame is divided into continuous intervals with equal duration and each interval is called a time slot (Ts). In one embodiment, one time slot is 625 μs so that a 5 ms WWAN frame includes exactly 8 time slots. The WWAN frame can be represented as having 625 μs time slots in order to align with WPAN radio (e.g., Blue Tooth) time slots.

In this example, during a WWAN scan interval, a WPAN radio transmits five complete WPAN frames and a WWAN radio transmits four complete WWAN frames. The first transmit period of the WPAN frame interferes with the first WWAN frame preamble so that the first WWAN frame preamble is not detected. By using signal FRAME_SYNC, a time slot of the WPAN frame is delayed so that it can be aligned with a rising edge of signal FRAME_SYNC. In this example, the WPAN radio receives signal FRAME_SYNC and waits until after a current WPAN frame completes before delaying the transmit interval and the receive interval so that (1) the transmit interval time slot is immediately prior to the receive interval time slot and (2) the receive interval time slot aligns with a rising edge of signal FRAME_SYNC. Delaying commencement of the receive time slot of a WPAN frame until a rising edge of signal FRAME_SYNC causes the preamble of a WWAN signal to not collide with a WPAN frame.

In another example (not depicted), the transmit interval time slot of a WPAN frame is delayed until a rising edge of signal FRAME_SYNC. Other time slots of a WPAN frame can be delayed to begin on the rising edge of signal FRAME_SYNC and to avoid collision with a preamble of a WWAN frame.

Accordingly, a master WPAN radio may adjust time slot activity between the master WPAN radio and servant WPAN radio. Adjusting the time slot activity may avoid interference caused by a preamble of a WWAN frame.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

The invention claimed is:

1. A method performed by a wireless communications device, the method comprising:
   requesting no transmission by a first radio for a first type of wireless communication during a first time region; and
   selectively adjusting a beginning of a time slot of a frame transmitted by a second radio based on one or more preambles of frames from a third radio for a third type of wireless communication while permitting simultaneous transmission of second and third radio frames, and the second radio providing a second type of wireless communication.

2. The method of claim 1, wherein the first radio comprises a WLAN transceiver, the second radio comprises a WPAN transceiver, and the third radio comprises a WWAN transceiver.

3. The method of claim 1, wherein the requesting no transmission comprises permitting transmission of second and third radios during the first time region.

4. The method of claim 1, further comprising:
   requesting no transmission by the third radio during a second time region and permitting transmission by the first radio during the second time region.

5. The method of claim 1, wherein the selectively adjusting a beginning of a time slot of a frame comprises:
   detecting a frame boundary of a frame from the third radio.

6. The method of claim 5, wherein the detecting a frame boundary comprises:
   detecting N preambles, where the period between the N preambles equals a period of the third radio frame, wherein N is at least 2.

7. The method of claim 1, wherein selectively adjusting a beginning of a time slot of a frame comprises:
   generating a frame synchronization signal and
   aligning a portion of the time slot of the frame with a portion of the frame synchronization signal, the frame synchronization signal delaying a start of the time slot.

8. The method of claim 7, wherein the generating a frame synchronization signal comprises determining offset and period parameters of the frame synchronization signal.

9. An apparatus comprising:
   a first radio for a first type of wireless communication;
   a second radio for a second type of wireless communication;
   a third radio for a third type of wireless communication; and
   control logic to:
      request no transmission by the second radio during a first time region and
      selectively adjust a time slot of at least one frame transmitted by the third radio based on one or more preambles of frames of the first radio while permitting simultaneous transmission of first and third radio frames.

10. The apparatus of claim 9, wherein the first radio comprises a WWAN radio, the second radio comprises a WLAN radio, and the third radio comprises a WPAN radio.

11. The apparatus of claim 9, wherein to request no transmission is to permit transmission by the first and third radios during the first time region.

12. The apparatus of claim 9, wherein the control logic to selectively adjust is to detect a frame boundary of a frame of the first radio.

13. The apparatus of claim 12, wherein the control logic to detect a frame boundary is to detect N preambles, where the period between the N preambles equals a period of the frame of the first radio, wherein N is at least 2.

14. The apparatus of claim 9, wherein the control logic to selectively adjust a beginning of a time slot of a frame transmitted by the third radio is to:
   generate a frame synchronization signal and
   align a portion of at least one time slot with a portion of the frame synchronization signal.

15. The apparatus of claim 14, wherein the control logic to generate a frame synchronization signal is to determine offset and period parameters of the frame synchronization signal.

16. A system comprising:
   a first radio for WWAN wireless communication;
   a second radio for WLAN wireless communication;
   a third radio for WPAN wireless communication;
   at least one antenna communicatively coupled to one of the first, second, and third radios; and
   control logic to:
      request no transmission by the second radio during a first time region and
      selectively adjust a beginning of a time slot of a frame transmitted by the third radio based on one or more preambles of frames of the first radio while permitting simultaneous transmission by the first and third radios.

17. The system of claim 16, wherein the control logic to selectively adjust is to detect N preambles, wherein a period between the N preambles equals a period of the first radio frame and wherein N is at least 2.

18. The system of claim 16, wherein the control logic to selectively adjust a beginning of a time slot is to:
   generate a frame synchronization signal and
   align a portion of at least one time slot with a portion of the frame synchronization signal.

19. The system of claim 18, wherein the control logic to generate a frame synchronization signal is to determine offset and period parameters of the frame synchronization signal.

20. The method of claim 1, wherein the third radio performs the requesting and the adjusting.

21. The method of claim 7, wherein the portion comprises a beginning of a receive interval.

22. The apparatus of claim 9, wherein the first radio initiates use of the control logic.

23. The system of claim 16, wherein the first radio initiates use of the control logic.

* * * * *